Figure 3:
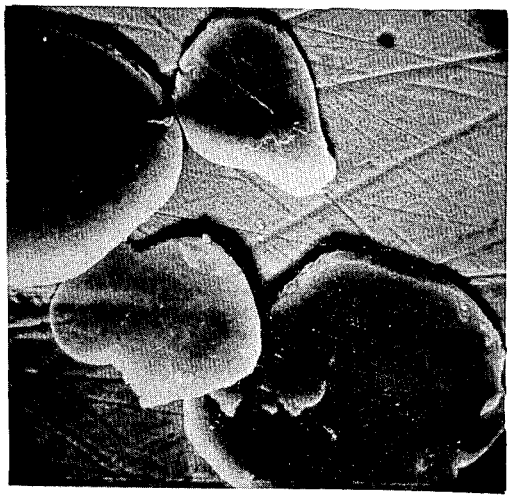

United States Patent [19]
Casey et al.

[11] 3,776,473
[45] Dec. 4, 1973

[54] HIGHLY REFLECTIVE ALUMINUM FLAKE

[75] Inventors: James T. Casey, Newfoundland; Frank A. Badia, Ringwood, both of N.J.

[73] Assignee: The International Nickel Company, Inc., New York, N.Y.

[22] Filed: Mar. 27, 1972

[21] Appl. No.: 238,375

[52] U.S. Cl. .................................................. 241/15
[51] Int. Cl. ............................................ B02c 17/00
[58] Field of Search ................................ 241/15, 30

[56] References Cited
UNITED STATES PATENTS
2,002,891   5/1935   Hall .................................. 241/15 X
3,709,439   1/1973   Tundermann et al. ................ 241/15

Primary Examiner—Granville Y. Custer, Jr.
Attorney—Ewan C. MacQueen et al.

[57] ABSTRACT

Aluminum flake powder having high specular reflectivity is produced by wet ball milling aluminum powder in the presence of a lubricant using a volume ratio of grinding balls to powder of at least 15:1 and a volume ratio of grinding balls to milling liquid (e.g., a light liquid hydrocarbon) which preferably is substantially equal.

7 Claims, 3 Drawing Figures

HIGHLY REFLECTIVE ALUMINUM FLAKE

Aluminum flake powders are today widely used in many applications and in substantial tonnage. In particular, aluminum flake powders are employed in decorative finishes, as in automotive and appliance applications, in maintenance paints, in inks, plastics, etc. In automotive finishes, aluminum flake is used to provide a polychromatic effect designated in the trade by terms such as "flop" and "sparkle." For this application a relatively fine flake particle usually of a size to pass a 325 mesh Tyler Standard Screen and having the highest possible reflectivity is desired. Coarser flakes are used in other decorative applications to provide "flash" or "sparkle" to painted surfaces. In maintenance paints, brightness or reflectivity of the aluminum powder material is of lesser importance and it is desired to maximize the covering power of the flake so that a given volume of paint will provide coverage for the maximum amount of metal or other surface to be painted. In ink applications, bright flake is again desired and usually even finer cuts than a −325 mesh fraction will be employed.

Brightness of flake-type pigments can be guaged qualitatively by simply rubbing a quantity of the pigment in the palm of a hand and observing the resulting color effect. More sophisticated tests involve the use of a photoelectric cell to measure the amount of light from a standard light source reflected from a surface comprised of a flake to be tested. Thickness of flake pigments can be measured by a simple standard water coverage test based on the area covered by a monolayer of flake having a given weight. Such a test is described, for example, in *Aluminum Paint and Powder*, J.D. Edwards and R.I. Wray, Third Edition, Reinhold Publishing Corp., New York (1955) at pages 18 to 21. The brightest aluminum pigment of commercial origin which has come to our attention exhibited a specular reflectivity ($R_s$) of 67.6 percent when measured by a test comprising preparing a monolayer of the flake to be measured by suspension of the flake upon a water surface, impinging a light beam at an incident angle of 60° from a standard light source and measuring the intensity of the reflected light beam by means of a photocell. The system was calibrated using a polished steel sheet sample coated with a bright nickel electroplate overplated with 15 microinches of standard chromium. This flake exhibited a water coverage by the aforementioned test of about 5,100 square centimeters per gram representing an average flake thickness of about 0.73 microns. The material had a particle size of which 98 percent passed a −325 mesh Tyler Standard Screen Scale. Other flake-type pigments of a commercial origin which we have tested by the foregoing means exhibited, respectively, a reflectivity of 50.1 percent, a water coverage of 4,140 square centimeters per gram (an average flake thickness of 0.89 microns) and particle size of which 99 percent passed a −325 mesh screen, and a reflectivity of 49 percent, a water coverage of 3,720 square centimeters per gram (an average flake thickness of 0.99 microns) and a −325 mesh particle size.

From the literature, it appears that the present methods employed in the manufacture of aluminum flake pigment chiefly involve ball milling a paste-like mixture of aluminum powder or chopped aluminum foil with a liquid such as mineral spirits and a small amount of lubricant such as stearic acid. It appears that the product powder after milling is graded by size to fit the market intended with the oversize being recycled to the mill for further grinding.

It appears that demand exists in the art for aluminum flake powder having materially better reflectivity and/or water coverage than do the presently available flake pigments powders. The present invention is directed to a method for providing such flake powders and to the flake powders thus provided.

Figure 1:
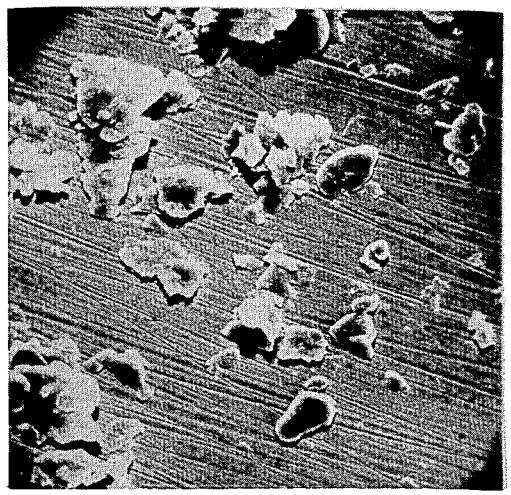

Objects of the present invention include provision of aluminum flake powders having improved specular reflectivity for use in paints and other applications and a method for producing such powders as will become apparent from the following description taken in conjunction with the drawing in which;

FIG. 1 is a reproduction of a scanning electron photomicrograph taken at a magnification of 500 diameters depicting the appearance of an aluminum flake powder of commercial origin.

Figure 2:
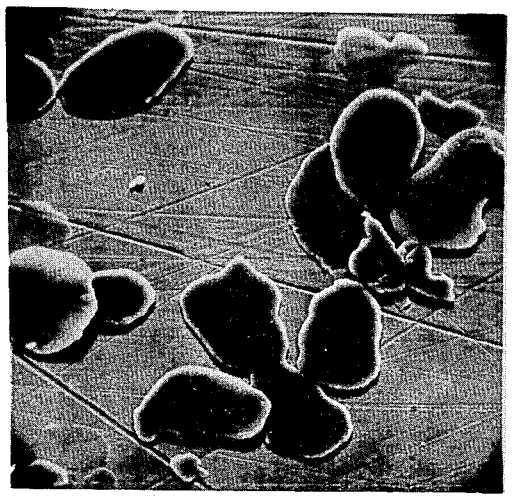

FIG. 2 is a reproduction of a scanning electron photomicrograph taken at a magnification of 500 diameters depicting the appearance of an aluminum flake powder produced in accordance with the present invention; and FIG. 3 is a reproduction of a scanning electron photomicrograph taken at a magnification of 2,000 diameters depicting the appearance of an aluminum flake powder produced in accordance with the present invention.

Generally speaking, the present invention contemplates the production of aluminum flake powders having either substantially improved specular reflectivity ($R_s$) which comprises wet ball milling aluminum powder, e.g., substantially spherical powder, such as that produced by atomization, in the presence of a lubricant using a volume ratio of grinding balls to powder of at least about 15:1, e.g., at least about 20:1 and up to about 75:1. Good results have been obtained at ball to liquid volume ratios of 2:1 to 1:1.25, and preferably the ratio of grinding balls to liquid employed will be substantially equal. The time of milling to achieve high $R_s$ will be relatively short, e.g., on the order of about two hours or about one hour or even less. It has been found that milling for an excessive amount of time can result in thinning the flake product to the point at which it starts to transmit light with an accompanying decrease in specular reflectivity. The product powder will have good water coverage.

Aluminum powder suitable for treatment in accordance with the invention is preferably of a type having a substantially spherical shape. The average particle size of the starting material may range from about 4 to about 300 microns. It is preferred in instances wherein flake product of small dimension is desired, e.g., a flake product which will substantially pass a 325 mesh Tyler screen (44 micron opening) to employ a fine starting powder, e.g., about 6 microns average size. When larger product flakes are desired, larger starting powders can be employed. Desirably, the milling process of the invention principally represents a flattening or flaking action exerted upon the starting powder. The milling liquid employed preferably is a light liquid hydrocarbon called "mineral spirits," usually having a specific gravity of about 0.7 to about 0.8 at 60°F. Other liquid hydrocarbons may be employed as those skilled in the art will appreciate. A lubricant such as stearic acid or other fatty acid, e.g., oleic, erusic, etc., are employed in amounts of about 0.5 to about 5 percent, e.g., about 1 percent, by weight of the powder being processed. It is found that when stearic acid is used as the lubricant, the product powder is coated with aluminum stearate apparently generated in situ during processing. The powder product is generally shipped in admixture with a minor amount of mineral spirits in the form of a paste. If desired, the excess mineral spirits can be removed and the flake product can be subjected to a polishing operation further to improve specular reflectivity.

In order to give those skilled in the art a better understanding of the invention the following examples are given:

EXAMPLE I

A number of ball mill runs were conducted in a conventional ball mill comprising a steel cylinder about 1 foot in diameter and about 6 inches long, which was rotated at a subcritical speed of about 45 rpm. In each run the milling liquid used was mineral spirits (AMSCO 66/3) having a viscosity of about 9.25 cps. and a specific gravity of about 0.77. In each run stearic acid in amount of about 1 percent of the aluminum powder weight was employed as a lubricant. Two types of commercially atomized aluminum powder (Alcan) were employed, each of which was essentially spherical in particle shape. Runs No. 1 through 11 in Table I were made using powder (Alcan MD–201) having an average particle size of about 17 microns as measured in the Fisher Sub Sieve Sizer (F.S.S.S.) and Runs No. 12 through 16 were made using powder (Alcan MD–X65) having an average particle size of about 6.4 microns F.S.S.S. Case hardened AISI 1018 steel balls were employed, with ball charges of balls having ⅛ inch and 5/16 inch diameter being used in individual runs. Parameters investigated included the ball-to-powder ratio, the ball size and running time. On the completion of each run, the flake powder product produced was examined to determine reflectivity and water coverage. Flake thickness was determined on the basis of the water coverage test results. Each product powder was screened to determine the percentage thereof which passed the 325 mesh screen. The results of the runs are summarized in the following Table I.

TABLE I

| Run No. | Ball weight, kg. | Liquid volume, cc. | Powder weight, grams | Mill volume | Volume ratio Ball/powder | Volume ratio Ball/liquid | Ball dia. (in.) |
|---|---|---|---|---|---|---|---|
| 1 | 11.444 | 1,456 | 98.28 | 34.9 | 40:1 | 1:1 | ⅛ |
| 2 | 11.444 | 1,456 | 98.28 | 34.9 | 40:1 | 1:1 | 5/16 |
| 3 | 11.444 | 1,456 | 65.50 | 34.8 | 60:1 | 1:1 | 5/16 |
| 4 | 11.444 | 1,456 | 98.28 | 34.9 | 40:1 | 1:1 | ⅛ |
| 5 | 14.451 | 1,456 | 98.28 | 40.0 | 50:1 | 1.25:1 | ⅛ |
| 6 | 9.432 | 1,500 | 81.00 | 32.4 | 40:1 | 1:1.25 | ⅛ |
| 7 | 11.444 | 1,456 | 98.28 | 34.9 | 40:1 | 1:1 | ⅛ |
| 8 | 11.444 | 728 | 65.50 | 26.2 | 60:1 | 2:1 | ⅛ |
| 9 | 11.444 | 728 | 98.28 | 26.3 | 40:1 | 2:1 | ⅛ |
| 10 | 11.444 | 1,092 | 98.28 | 30.6 | 40:1 | 1.33:1 | ⅛ |
| 11 | 11.444 | 1,456 | 131.00 | 35.3 | 30:1 | 1:1 | ⅛ |
| 12 | 11.444 | 728 | 65.50 | 26.2 | 60:1 | 2:1 | 5/16 |
| 13 | 11.444 | 728 | 98.28 | 26.3 | 40:1 | 2:1 | 5/16 |
| 14 | 11.444 | 1,456 | 98.28 | 34.9 | 40:1 | 1:1 | ⅛ |
| 15 | 11.444 | 1,456 | 65.50 | 34.8 | 60:1 | 1:1 | ⅛ |
| 16 | 11.444 | 1,456 | 98.28 | 34.9 | 40:1 | 1:1 | ⅛ |

| Run No. | Mill time (hrs.) | $R_s$, percent | Water coverage, cm.²/gm. | Tk, μ | Percent −325 mesh |
|---|---|---|---|---|---|
| 1 | 2 | 83.2 | 3,275 | 1.13 | 60 |
| 2 | 3 | 81.3 | 3,740 | .99 | 30 |
| 3 | 3 | 77.6 | 4,560 | .81 | 30 |
| 4 | 3 | 83.2 | 3,120 | 1.19 | 75 |
| 5 | 3 | 79.4 | 3,175 | 1.17 | 85 |
| 6 | 3 | 81.2 | 3,000 | 1.23 | 55 |
| 7 | 1 | 83.2 | 3,000 | 1.23 | 75 |
| 7 | 4 | 81.3 | 5,000 | .74 | 50 |
| 7 | 5 | 79.4 | 4,900 | .75 | 30 |
| 7 | 6 | 79.4 | 5,600 | .66 | 25 |
| 7 | 7 | 75.8 | 6,640 | .56 | 25 |
| 7 | 8 | 75.8 | 5,800 | .64 | 20 |
| 8 | 2 | 77.6 | 4,600 | .80 | 60 |
| 8 | 3 | 79.4 | 4,800 | .77 | 50 |
| 9 | 2 | 81.3 | 4,400 | .84 | 60 |
| 9 | 3 | 79.4 | 6,100 | .60 | 45 |
| 10 | 3 | 83.2 | 3,600 | 1.0 | 50 |
| 11 | 2 | 83.1 | 3,340 | 1.10 | — |
| 12 | 3 | 70.8 | 7,700 | .48 | 65 |
| 13 | 3 | 69.2 | 7,400 | .45 | 70 |
| 14 | 2 | 66.1 | 6,470 | .57 | 85 |
| 15 | 3 | 60.3 | 9,400 | .39 | 95+ |
| 16 | ½ | 69.1 | 3,200 | 1.15 | 98 |
| 16 | 1 | 70.8 | 5,500 | .67 | 98 |
| 16 | 1½ | 70.8 | 6,100 | .61 | 95 |
| 16 | 3 | 66.1 | 11,000 | .31 | 95 |

Inspection of the data as set forth in Table I shows that flake products having a higher reflectivity were obtained when the larter initial powder size was employed. Reflectivity was especially high when the flake product had a thickness of about 1 micron. In general, the best reflectivity was obtained using the coarser starting powder and the best water coverage was obtained using the finer starting powder. Inspection of the data demonstrates that in accordance with the invention aluminum flake powder having a specular reflectivity in excess of 80 percent or a water coverage exceeding 7,000 square centimeters per gram may readily be provided. The data also demonstrated that powders having combined properties including a specular reflectivity exceeding 70 percent combined with a water coverage exceeding 7,600 square centimeters per gram may readily be provided.

Data obtained as set forth in Table I was subjected to regression analysis and the following reflectivity equation was derived which is believed valid over the range of variables examined.

$R_s = 9.86 - 0.235$ B/P $- 12.326$ Powder Type $- 0.1117$ (time)$^2$ where $R_s$ = specular reflectivity in percent
B/P = Ball/Powder volume ratio
Powder Type = 0 for MD–201 and 1 for MD–X65
Time = ball mill time in hours It will be appreciated that in scale-up to larger mills it would be anticipated that a reduction in required milling time would result. It is anticipated that the equation would have validity in scale-up of the process.

The equation provides confirmation that the ball to powder ratio is the significant variable in relation to $R_s$ of the product.

In other runs conducted under conditions similar to Run No. 18 but with ball to powder ratios of 10:1 and 5:1, respectively, $R_s$ values of 77.6 percent and 63.7 percent with average flake powder thicknesses of 2.01 and 3.29 microns where obtained, with poor water coverage values in both instances. These values were considered to be unsatisfactory overall and to constitute further confirmation that the ball to powder ratio should be at least about 15:1.

The effect of milling time in reducing the thickness of the product powder with concomitant loss of specular reflectivity due to translucence of the powder is set forth in the following Example II.

EXAMPLE II

A commercial atomized aluminum powder was screened to remove therefrom the −325 mesh fraction. The −325 mesh fraction was milled for 10 hours using the same mill and the same types of balls described hereinbefore, using a liquid to powder volume ratio of 33.5:1 and a 1 percent by weight of stearic acid lubricant addition. At the end of the second hour and at succeeding hours thereafter during the course of the run, some powder product was removed from the mill to check reflectivity and thickness as determined by water coverage The results are set forth in the following Table II.

TABLE II

| Processing Time Hours | $R_s$ — % | Water Coverage (cm²/gm) | Thickness microns |
| --- | --- | --- | --- |
| 2 | 70.8 | 4,760 | 0.77 |
| 3 | 75.9 | 6,900 | 0.53 |
| 4 | 72.4 | 7,440 | 0.49 |
| 5 | 67.8 | 7,800 | 0.47 |
| 6 | 58.9 | 11,950 | 0.31 |
| 7 | 55.0 | 13,000 | 0.29 |
| 9 | 57.5 | 15,600 | 0.23 |
| 10 | 57.5 | 15,610 | 0.23 |

It is to be seen that the reflectivity reached a peak of about 3 hours of processing and that further processing reduced both the specular reflectivity and the thickness of the flake, while water coverage continued to increase to quite remarkable values. Some transmission of light through flake having a thickness of about 0.23 microns was noted, however, such products can have enhanced utility in polychromatic automotive finishes where reflectivity provides "flash," "sparkle" and "flop" for a given amount of flake added, while high covering powder and low thickness provide improved gloss and tinting strength with reduced "seeding" due to protusion of flakes through the surface, all combined with improved economics.

In order to illustrate a further advantage of the invention, namely, that high specular reflectivity is retained even in milled flake particles in the lower size ranges, the following Example III is provided.

EXAMPLE III

Material from run No. 1 of Example I was screened and the individual size cuts thus obtained were each examined for specular reflectivity and water coverage employing the techniques described hereinbefore. The results set forth in the following Table III were obtained.

TABLE III

| Size cut Average Size of flake major dimension microns | $R_s$ — % | Water Coverage cm²/gm | Thickness microns |
| --- | --- | --- | --- |
| −44μ | 83.2 | 3,275 | 1.13 |
| −30 μ | 80.0 | 4,100 | 0.90 |

The data set forth in the foregoing Table III illustrate that specular reflectivity was retained to a large extent even with fine size cuts.

EXAMPLE IV

Certain of the flake products produced as described in Example I were subjected to screen analysis with the results set forth in the following Table IV.

TABLE IV

| Run No. | +74μ % | −74μ +44μ% | Size Range −44μ +30μ% | −30μ +20μ% | −20μ +10μ% | −10μ % |
| --- | --- | --- | --- | --- | --- | --- |
| 2 | 31.2 | 34.4 | 20 | 11.1 | 3.3 | |
| 9 | 44.7 | 23 | 17.2 | 13.4 | 1.7 | |
| 12 | 5 | 3 | 20 | 26 | 40.6 | 5.4 |
| 16 | 2.6 | 4.4 | 7.8 | 17.5 | 60.4 | 7.4 |

The size range distribution produced directly as set forth in Table IV indicate that the products may be used directly in many applications or can be sized to provide special size cuts to meet application requirements.

The high specular reflectivity provided in flake products produced in accordance with the invention is confirmed by the generally rounded shape of the products as illustrated particularly by FIGS. 2 and 3 which demonstrate the smooth, almost defect-free, flat surfaces relatively free of embedded particles or debris and having smooth edges produced in the product of Run No. 1. By comparison, the flake product of FIG. 1, which depicts the shape of a commercial product considered to have high reflectivity at the same magnification as in FIG. 2 (500 diameters), is seen to be relatively more irregular in shape and rougher in surface configuration than is the product of the invention.

The flake products of the invention have utility not only in oil or water-base paints, inks and artists' supplies as pigment materials but also for the production of decorative effects in floor tile, sheet plastics, e.g., vinyl plastics, rubber articles such as tire sidewalls, glass, enamelware, white ceramic ware, etc. The aluminum flake may be used to produce powder coatings as in furniture applications, textiles, etc., and in building products such as roofing paints. Because aluminum flake is non-toxic, it may be used in cosmetic applications including nail polish and lipstick. The flake can be anodized and colored to provide special decorative effects.

Although the present invention has been described in conjunction with aluminum as a preferred embodiment it is to be understood that modifications and variations may be resorted to without departing from the spirit and scope of the invention as those skilled in the art will readily understand. Thus, other metallic powders including copper, copper-base alloys such as brasses and gold may be treated in accordance with the invention. Such modifications and variations are considered to be within the purview and scope of the invention and appended claims.

We claim:

1. The method for producing aluminum flake powder having high specular reflectivity which comprises wet ball milling aluminum powder in the presence of a lubricant with a volume ratio of grinding balls to powder being treated of at least about 15:1, a volume ratio of grinding balls to milling liquid in the range of about 2:1 to about 1:1.25 for a time sufficient to provide substantial thinning of the aluminum powder being treated and to produce aluminum flake powder having individual particles characterized by flat, smooth surfaces and a generally rounded shape.

2. The method of claim 1 wherein the volume ratio of grinding balls to powder does not exceed about 75:1 and the volume ratio of grinding balls to milling liquid is substantially equal.

3. The method of claim 1 wherein the milling liquid is a light liquid hydrocarbon.

4. The method of claim 1 wherein the aluminum powder treated is substantially spherical in shape and has an average particle size in the range of about 4 to about 300 microns.

5. The method of claim 1 wherein the grinding balls are steel balls having an average diameter not substantially exceeding about 5/16 inch and the milling time does not exceed about 2 hours.

6. The method of claim 3 wherein the lubricant is a fatty acid.

7. The method of claim 3 wherein the lubricant is stearic acid.

* * * * *

UNITED STATES PATENT OFFICE
CERTIFICATE OF CORRECTION

Patent No. 3,776,473  Dated December 4, 1973

Inventor(s) James T. Casey, Frank A. Badia

It is certified that error appears in the above-identified patent and that said Letters Patent are hereby corrected as shown below:

Col. 4, line 22, for "larter" read --larger--.

Line 41, in the equation, for "9.86" read --91.86--.

Col. 5, line 27, for "of" read --at--.

Line 37, for "powder" read --power--.

Col. 6, lines 52 to 54, delete the sentence beginning with the word "Thus" and ending with the word "invention".

Insert claim 8

--8. The method of claim 1 wherein the grinding balls are steel balls.--

On the cover sheet "7 claims" should read --8 claims --

Signed and sealed this 6th day of August 1974.

(SEAL)
Attest:

McCOY M. GIBSON, JR.
Attesting Officer

C. MARSHALL DANN
Commissioner of Patents